United States Patent [19]
Struyk

[11] Patent Number: 5,877,955
[45] Date of Patent: Mar. 2, 1999

[54] TRANSDUCERLESS POSITION DETERMINING SYSTEM AND METHOD FOR THE SAME

[75] Inventor: David A. Struyk, Excelsior, Minn.

[73] Assignee: Waterstrike Incorporated, Excelsior, Minn.

[21] Appl. No.: 558,015

[22] Filed: Nov. 13, 1995

[51] Int. Cl.⁶ .............................................. G05B 19/416
[52] U.S. Cl. ................... 364/174; 364/528.37; 364/578; 364/149; 702/94; 318/271; 318/276; 388/907.5
[58] Field of Search ..................... 364/174, 565, 364/550, 551.01, 556, 566, 426.01, 426.024, 578, 167.01, 148–151, 528.1, 528.22, 528.25, 528.33, 528.37, 528.39; 318/254, 276, 274, 271, 270, 807, 720; 388/907.5, 909, 842, 848; 440/900, 87.2; 73/187, 185, 861.77, 116, 170.11, 170.14, 861.65; 324/177, 207.25, 772; 340/669–672; 702/33, 38, 57, 64, 94, 98, 104, 105, 113, 115, 141, 142, 145, 147, 148, 150, 151

[56] References Cited

U.S. PATENT DOCUMENTS

| | | |
|---|---|---|
| 439,442 | 10/1890 | Thorne et al. .............................. 73/187 |
| 1,905,401 | 4/1933 | Moller ........................................ 73/187 |
| 2,633,745 | 4/1953 | Reis ........................................... 73/187 |
| 3,137,164 | 6/1964 | Spencer, Jr. ............................... 374/119 |
| 3,568,059 | 3/1971 | Sordello ................................... 324/177 |
| 3,665,764 | 5/1972 | Roberts ................................ 73/861.77 |
| 3,756,077 | 9/1973 | Milovancevic ............................ 73/187 |
| 3,824,854 | 7/1974 | Weinstein .................................. 73/185 |
| 4,788,497 | 11/1988 | Katsumura ............................... 324/177 |
| 4,959,596 | 9/1990 | MacMinn et al. ........................ 318/254 |
| 4,972,332 | 11/1990 | Luebbering et al. .................... 364/565 |
| 5,056,360 | 10/1991 | Dosdall et al. ............................ 73/116 |
| 5,187,978 | 2/1993 | Tendler ...................................... 73/187 |
| 5,196,790 | 3/1993 | Ito ........................................... 324/177 |
| 5,249,118 | 9/1993 | Smith ................................. 364/167.01 |
| 5,366,394 | 11/1994 | Kanno ......................................... 440/2 |
| 5,418,442 | 5/1995 | Araki ....................................... 318/651 |
| 5,485,065 | 1/1996 | Kaneko et al. .......................... 318/276 |
| 5,533,166 | 7/1996 | Yoshida et al. ....................... 388/907.5 |
| 5,585,709 | 12/1996 | Januen et al. ............................ 318/807 |
| 5,594,307 | 1/1997 | Adachi et al. ........................... 364/151 |
| 5,597,953 | 1/1997 | Struyk .................................. 73/170.14 |
| 5,608,300 | 3/1997 | Kawabata et al. ....................... 318/254 |
| 5,703,449 | 12/1997 | Nagate et al. ........................... 318/254 |

OTHER PUBLICATIONS

U.S. Statutory Invention Registration H939, Jul. 2, 1991, Holland.

*Primary Examiner*—Hal Dodge Wachsman
*Attorney, Agent, or Firm*—Brian F. Schroeder

[57] ABSTRACT

A transducerless position determining system and method of using the same for determining the relative position of a mechanical member or component which is driven by an electric motor within an electromechanical system. The transducerless position determining system includes a microcontroller with a software model that simulates the acceleration, deceleration and velocity characteristics of the electric motor as a function of applied voltage thereto and the load characteristics of the electromechanical system. The applied voltage is sampled electronically to monitor its amplitude level, and microcontroller software and associated circuitry is used to accurately detect application and removal of the applied voltage to the electric motor. While taking into account the simulated acceleration and deceleration of the electric motor, the software model controls a software-based variable speed counter which increments and decrements relative to the direction of motor operation at a rate of speed proportional therewith. The proportional data generated by the variable speed counter correlates with the relative position of the movable component, and can be converted and scaled for appropriate display purposes. The system uses a predetermined reference position of the mechanical component within the electromechanical system to correlate re-synchronization of the software model for the electric motor.

32 Claims, 6 Drawing Sheets

| D₀ | D₁ | MOTOR OPERATION |
|---|---|---|
| 0 | 0 | STOP |
| 0 | 1 | REVERSE |
| 1 | 0 | FORWARD |
| 1 | 1 | STOP |

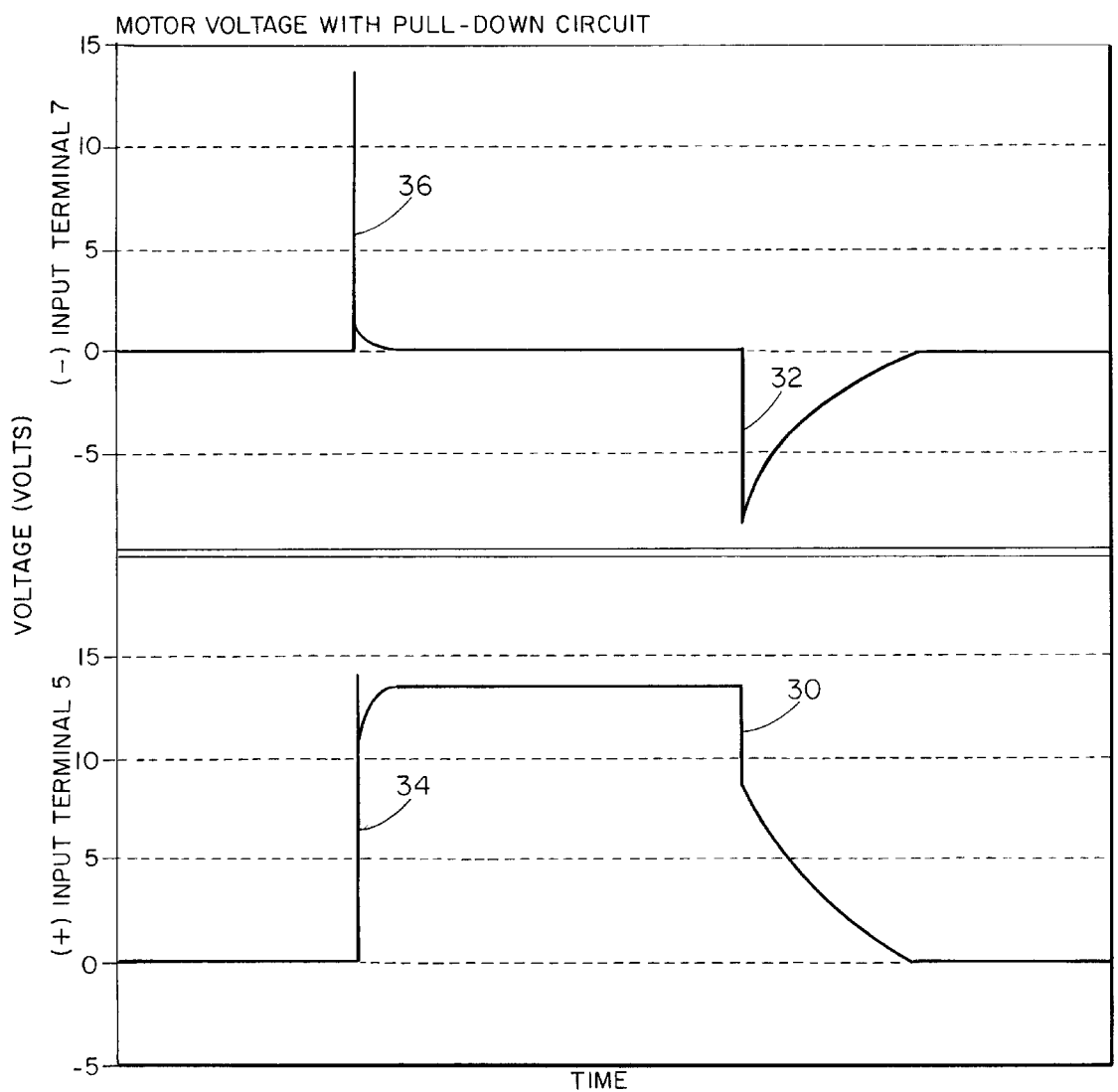

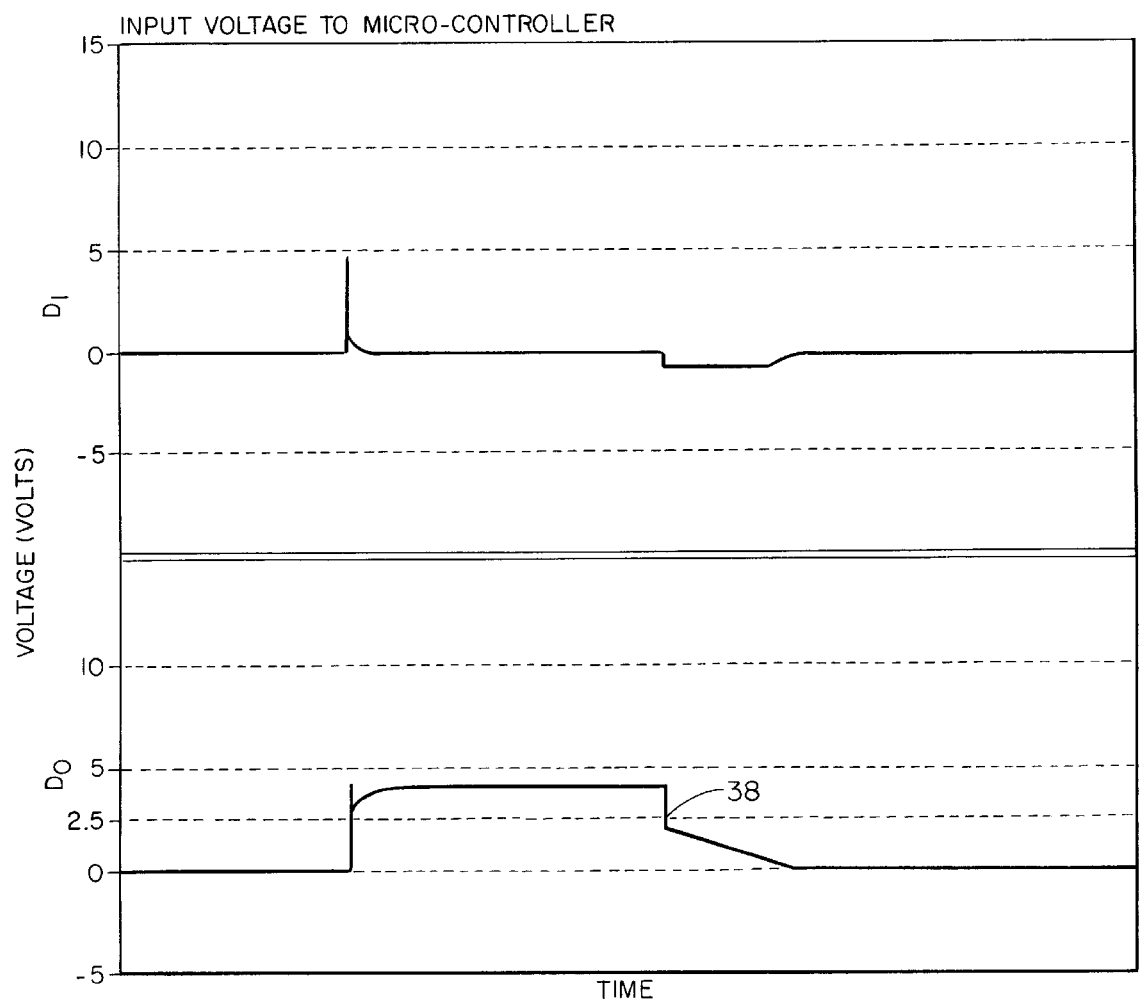

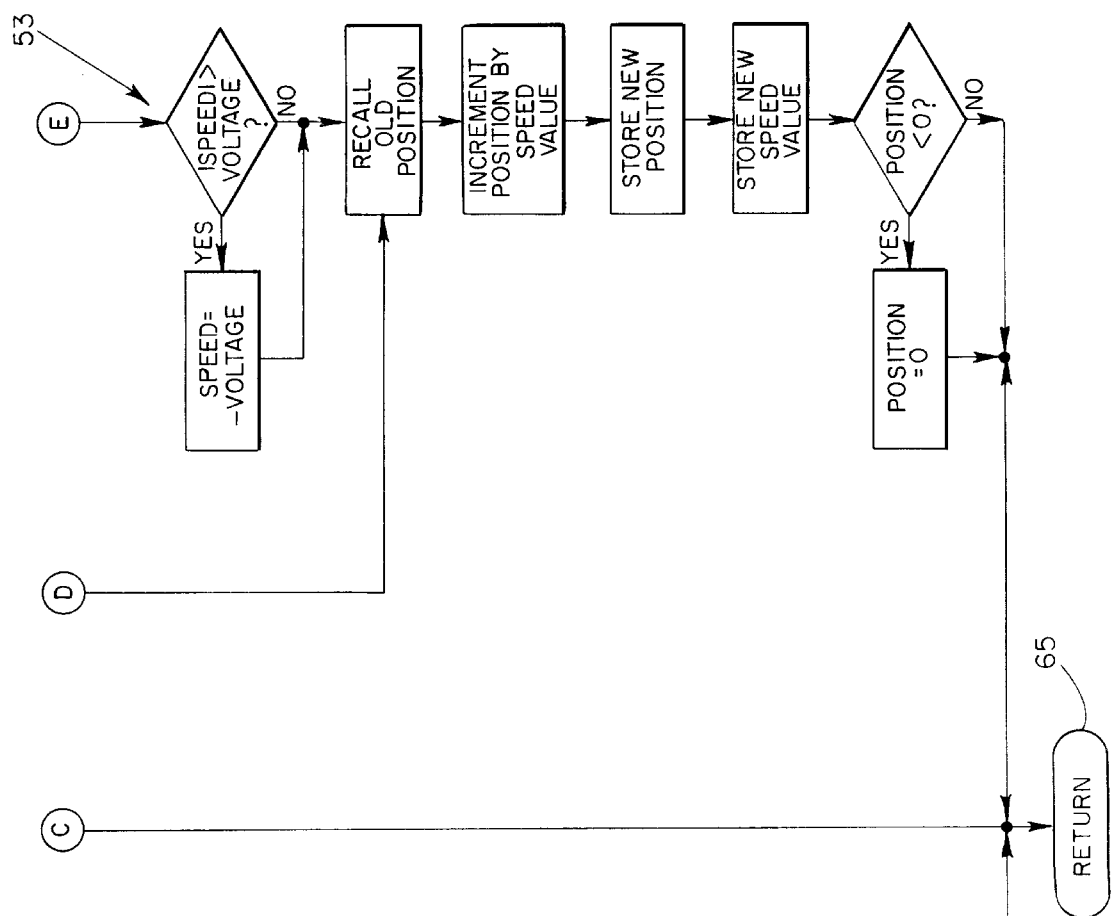
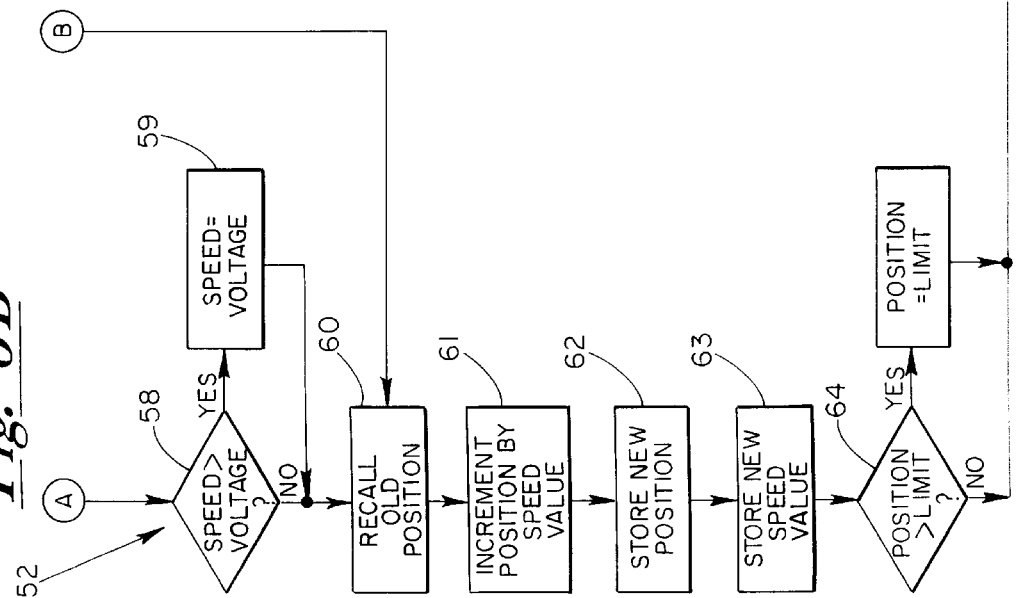
Fig.-6B 5,877,955

TRANSDUCERLESS POSITION DETERMINING SYSTEM AND METHOD FOR THE SAME

BACKGROUND OF THE INVENTION

The instant invention is related generally to position determining systems, and more specifically to a position determining system which does not require the use of an electronic position indicating transducer for determining the relative position of a movable member or component within an electromechanical system.

Generally, it is often desirable to monitor the position of a movable mechanical component or subsystem within a larger system. In an electromechanical system, this is conventionally accomplished electronically, through the use of an electronic position indicating transducer. Such electronic position indicating transducers may be of any of a variety of configurations (i.e., resistive, capacitive, optical, etc., either rotary or linear). Nearly all such transducers have an associated cost therewith which may be significant in relation to the size of the electromechanical system in which it is used. In many applications, such as one where the environment may be hostile to the transducer, or where the transducer is prohibitively expensive, it may be quite desirable, if possible, to eliminate the transducer altogether.

For instance, in one such application related to the use of personal watercraft devices, it is desirable to measure the position of a rotary shaft which controls the position of the watercraft's jet nozzle. Altering the position of the jet nozzle changes the attitude of the craft in the water, thus achieving the function of trim. This is analogous to adjusting the "trim" on other boats and marine vehicles so equipped with this function. In relation to such personal watercraft, cost is a significant concern, as the electromechanical system involved is not of large scale. Also, there are significant reliability concerns over the use of such a transducer for measuring the position of the jet nozzle, since such personal watercraft are commonly subjected to the harsh marine environment of substantial vibration and corrosive salt water. Nevertheless, on personal watercraft equipped with such a trim function, it is desirable for the operator of such craft to have knowledge of the position of the jet nozzle at all times. For these reasons, it can be seen that it would be particularly advantageous to provide a position determining system for use in such application which does not require the use of such a position indicating transducer. To this end, the instant invention, as described herein and throughout the appended claims, solves the above problems by providing a transducerless position determining system and method of using the same for applications, such as that described above, where it may not be desirable to incorporate such a transducer.

BRIEF SUMMARY OF THE INVENTION

The present invention concerns a position determining device which is devoid of a position indicating transducer for actual measurement of the position of a movable component.

In an electromechanical system, where some form of synchronization or known initial position of a movable component is present, the position of the movable component within such system may be determined if the precise time of application and removal of power to the electric motor is known, and the velocity, acceleration and deceleration characteristics of the electric motor, as a function of applied voltage and associated load characteristics of the system, are known. Under such circumstances, through the use of an appropriate software model of the electric motor and a variable speed counter, accurate positional data may be generated and used to display the current position of a movable component within the system.

However, because of inherent problems associated with non-ideal switching of conventional multiple-contact direction control switches, floating generated voltages produced by electric motors upon removal of power therefrom, and problems associated with accounting for acceleration, deceleration, and motor run-on as a result of the momentum and load of the system, implementing such a transducerless position determining system within an electromechanical system is problematic. Non-ideal switching of a direction control switch and residual floating voltage on the terminals of an electric motor, upon removal of power therefrom, are significant sources of error in determining the precise time of application or removal of power to such motor. Such sources of error will compound and degrade the reliability of the system if not accounted for.

Since accurate information as to the time of power application and removal is essential in order to accurately model the operation of the electric motor, it is necessary to provide a sophisticated detection means for determining such information. To accomplish this end, the present invention employs a differential input detection means which receives and analyzes voltage data received from both power input terminals to the electric motor to determine the precise time of application or removal of power therefrom. The differential input detection means is designed such that it will only sense application of applied voltage to the electric motor upon sensing that the voltage level on one of the input terminals has risen above a predetermined threshold level, and the voltage level on the opposite input terminal of the electric motor has dropped to a level below such predetermined threshold level. This eliminates the possibility of detecting applied voltage to the input terminals of the electric motor prematurely.

As used anywhere within the specification herein, or within the appended claims, the phrase "differential input detection" refers to a means by which both power input terminals to the electric motor are monitored, and application of applied voltage thereto is not detected unless and until a differential input voltage occurs across such terminals to the extent that the voltage level present on one terminal is above a predetermined threshold level and the voltage level present on the other terminal is below such predetermined threshold level.

Even with the use of the above differential input detection means, residual floating voltage generated by the electric motor after removal of applied power therefrom can still cause significant delays in the detection of power removal. To overcome the potential for error caused by the electric motor acting as a generator, the differential input detecting means of the present invention employs a differential voltage divider pull-down circuit connected to each of the input power terminals of the electric motor, which virtually instantaneously pulls any floated generated voltage produced by the motor to be centered about ground, thereby causing a sharp transition in voltage level at the input terminals of the electric motor when the applied voltage is removed therefrom. The differential input detecting means may then readily detect the sharp transition in voltage level, which would otherwise be a slow degeneration that may go undetected.

Once accurate detection of application and removal of applied voltage to the electric motor is accomplished, the data obtained from the input detection means can be used to control the operation of a transducerless position determining means. Such position determining means is comprised generally of an appropriate software model contained within a microcontroller that is designed to simulate substantially the acceleration, deceleration and velocity characteristics of the electric motor as a function of applied voltage thereto and the associated load characteristics of the electromechanical system within which it operates.

The software model is developed through predetermined testing and collection of empirical data. By taking careful timing measurements, the speed of the electric motor within the electromechanical system can be determined as a function of applied voltage to the motor. For voltages of varying amplitude levels, the speed of the motor within the electromechanical system will vary. Once the speed of the motor's system has been determined, the acceleration and deceleration characteristics can also be determined through careful distance measurements and use of previous data obtained for the speed of the system as a function of applied voltage.

Once the speed, acceleration, and deceleration characteristics of the electric motor within the electromechanical system are determined, the system is considered characterized and the position of the motor shaft, and consequently the movable component driven thereby, can be determined through the use of a variable speed counter which is controlled by the differential input detection means and software model within the microcontroller. The variable speed counter is incremented and decremented in accordance with the direction of motor operation at a rate of speed proportional to the simulated speed of the electric motor determined by the software model, while accounting for acceleration and deceleration characteristics thereof. The counter is thus able to alter its rate based on the measured applied voltage to the electric motor, which is proportional to the actual speed of the electric motor within the electromechanical system. Upon disconnect of the applied voltage, the counter allows for the appropriate amount of run-on as a result of deceleration. The data obtained from the variable speed counter is scaled to appropriately represent the desired units, such as degrees, and is then sent to a display as readable positional information.

Since there is no actual physical measurement involved, the possibility exists that, over a prolonged period of time, errors could compound to the point where the determined position may no longer accurately represent the actual position of the motor. Therefore, it is desirable and preferred that the transducerless position determining system undergo periodic re-synchronization, which may be implemented in either of several ways, or as a combination of the following: the system can be synchronized manually from time to time as necessary; automatically from a single position indicator, assuming the movable component of the system periodically passes over a known reference position; or, in the case of known limited travel, automatically when one or more of the end points of both the actual known travel and the determined position are reached.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 4 is a graphical representation of the voltage present on both input terminals to an electric motor, showing the effects of my differential voltage divider pull-down circuitry which causes a sharp transition in voltage level at both terminals upon removal of power therefrom;

FIG. 5 is another graphical representation showing the effects of my differential voltage divider pull-down circuitry in scaling the motor input voltage for proper detection thereof by the differential input detection means of my transducerless position determining system; and FIGS. 6A and 6B comprise collectively a flow diagram showing operation of the position determining process executed by the software model of the electric motor which forms a part of my transducerless position determining system.

DETAILED DESCRIPTION OF THE INVENTION

Figure 1:
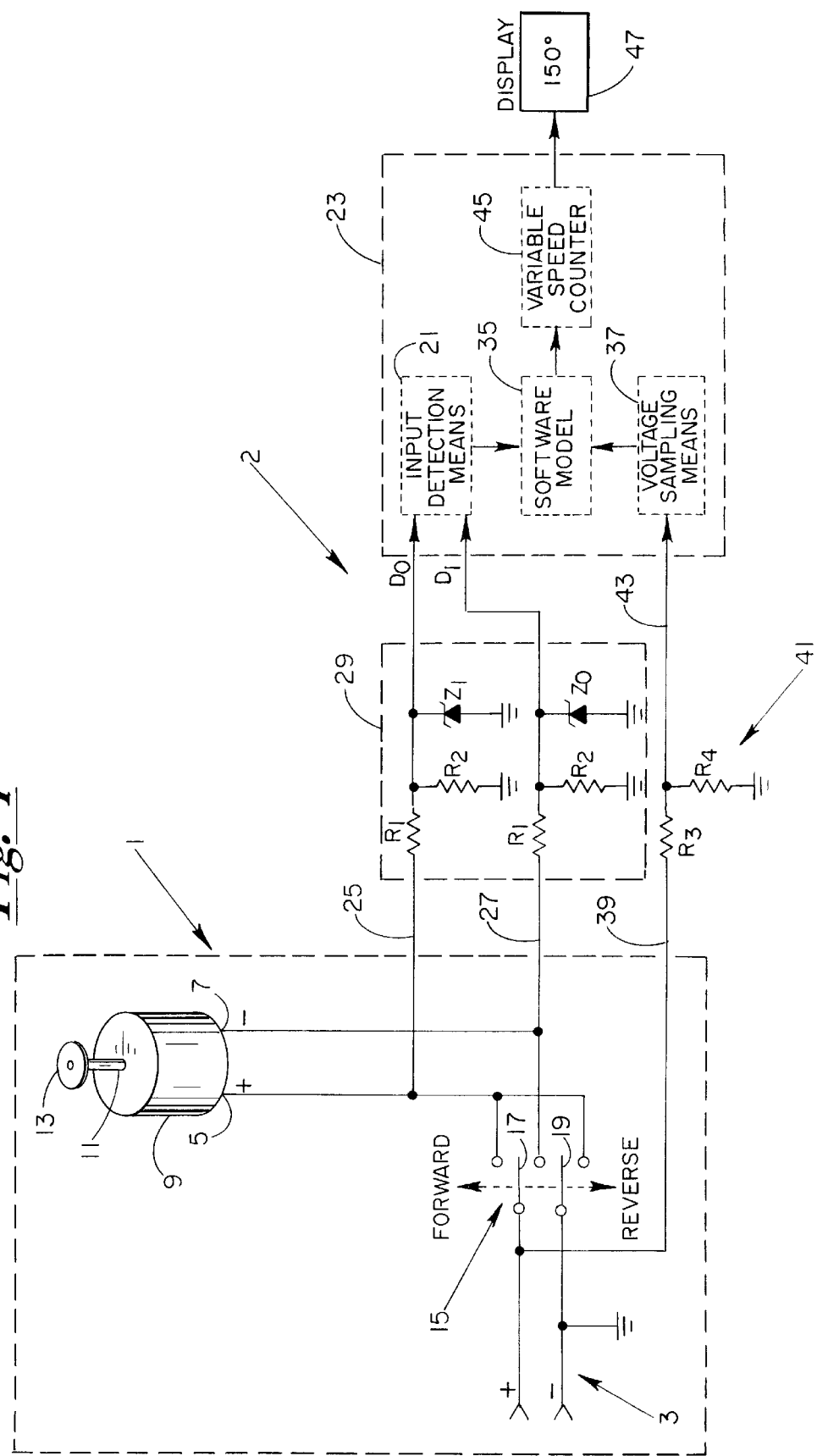
FIG. 1 is a diagrammatic representation of my transducerless position determining system, showing schematically the interconnections thereof with an electromechanical system.

As shown in FIG. 1, there exists an electromechanical system 1 with associated load characteristics to which my new transducerless position determining system 2 connects. The electromechanical system 1 includes a power supply 3 connected to the positive and negative power input terminals 5 and 7, respectively, of electric motor 9. The electric motor 9 has a drive shaft 11 which is drivingly connected to a movable component 13. Although component 13 may have any conceivable range of movement, for purposes of illustrating full operation of the invention described herein, movable component 13 will be considered to have a limited range of movement corresponding to the rotation of drive shaft 11 from 0°–150°. Movement of shaft 11 in either direction to its extreme endpoints will cause electric motor 9 to enter a clutch mode, thereby prohibiting further movement of shaft 11 while motor 9 continues to run.

The power supply 3 is connected to input terminals 5 and 7 via a conventional direction control switch 15 of usual variety. Such a switch generally includes at least two contacts 17 and 19 which mate with the opposing power input terminals 5 and 7 of the electric motor 9 upon pressing the switch in one or more directions. Pressing the switch 15 in one direction will generally cause the supply voltage to be applied to the input terminals of the electric motor 9 in such a manner that the motor system operates in a forward direction, and pressing the switch 15 in the opposite direction causes the polarity of the supply voltage to be reversed so as to be applied to motor 9 in such a manner that it operates in a reverse direction.

If electrical contact of such switch contacts 17 and 19 were ideal, both contacts 17 and 19 would mate with power input terminals 5 and 7 at exactly the same time, and it would be only necessary to monitor one of the power input terminals to determine the exact time of power application thereto. However, such switches rarely operate in an ideal manner, and oftentimes one of the contacts of such a switch 15 will mate with one power input terminal to the electric motor 9 prior to the other contact making such connection. In such case, complete connection is not made, and consequently no power is applied until the second contact mates with its respective input terminal. If only one power input terminal is being monitored, this can cause significant errors in determining the correct timing of the application of applied voltage.

Since it is imperative for proper operation of my transducerless position determining system 2 to have accurate detection of the precise start and stop points of application of applied voltage to the electric motor 9, the present invention employs a differential input detection means 21 within microcontroller 23 which receives and analyzes voltage data received from both power input terminals 5 and 7 of electric motor 9. As shown in the schematic in FIG. 1, the power input terminal 5 of electric motor 9 is connected via line 25 to microcontroller input $D_0$, and power input terminal 7 of electric motor 9 is connected via line 27 to input $D_1$ of microcontroller 23.

Figures 2, 3:
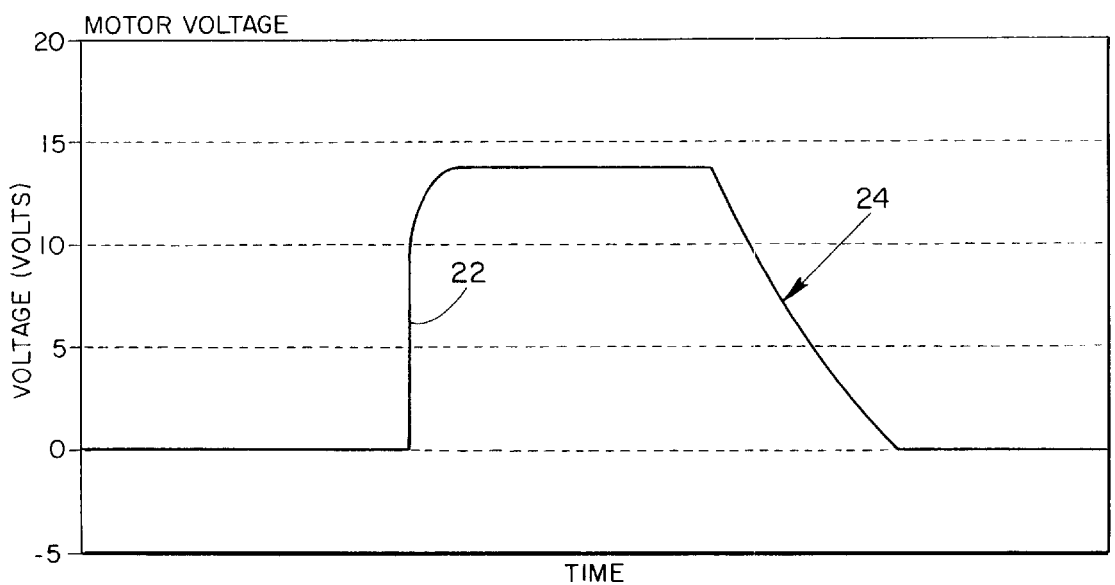
FIG. 2 discloses a truth table which sets forth the operation of the differential input detection means which is used to accurately determine application or removal of applied voltage to the electric motor of the electromechanical system.
FIG. 3 is a graphical representation of the voltage present at one of the input terminals to the electric motor when no differential voltage divider pull-down circuitry is used, showing a sharp rise upon application of power thereto, and the slow, degeneration of voltage upon removal of power therefrom.

Operation of the differential input detection means 21 is best illustrated through the truth table shown in FIG. 2, wherein it can be seen that the input detection means 21 is constructed such that it will only sense the application of applied voltage from power supply 3 to the electric motor 9 upon sensing that the voltage level at one of the inputs, $D_0$ or $D_1$, has risen above a predetermined threshold level (designated by a "1" in FIG. 2), and the voltage level sensed at the opposite input of the detection means 21 has dropped to a level below such predetermined threshold voltage level (designated as a "0" in FIG. 2).

Although for any given system, the threshold voltage level should be set according to system parameters, for purposes of illustrating the operation of the differential input detection means 21 in the instant application, the predetermined threshold voltage level is preferably set at 2.5 volts. Thus, a "1" denoted in the truth table in FIG. 2 is equivalent to sensing a voltage level in excess of 2.5 volts, whereas a "0" denoted in the truth table of FIG. 2 indicates the sensing of a voltage level below 2.5 volts. With this in mind, it can be seen from FIG. 2 that the differential input detection means 21 will only sense operation of the electric motor in the forward direction upon sensing a voltage level greater than 2.5 volts at input $D_0$, and a voltage of less than 2.5 volts at the input $D_1$. For detection of reverse operation of electric motor 9, the differential input detection means 21 must sense a voltage level greater than 2.5 volts at input $D_1$, and a voltage level less than 2.5 volts at input $D_0$.

As noted in the truth table shown in FIG. 2, should the voltage level sensed at both inputs $D_0$ and $D_1$, corresponding to input terminals 5 and 7 of electric motor 9, be either below 2.5 volts or above 2.5 volts, no detection of motor operation is sensed, as such conditions indicate that either no power is applied to electric motor 9 or that only one of the two contacts have mated with their respective input terminals 5 and 7 thereof. As will become evident hereinafter in discussing the operation of my transducerless position determining system 2, such detection of applied voltage is accomplished by sampling the voltage level at inputs $D_0$ and $D_1$, and determining via software within microcontroller 23 the mode of operation of electric motor 9.

In order for the differential input detection means 21 to accurately determine the time of power application to or removal from motor 9, it is desirable to have a sharp transition from a low voltage (0) to a high voltage (1), or vice versa, at inputs $D_0$ and $D_1$. During application of an applied voltage to the electric motor 9, this does not present a problem. As shown in FIG. 3, upon application of applied voltage (designated by numeral 22) to motor 9, the transition from low to high is nearly instantaneous. However, as is further apparent from the graph shown in FIG. 3, removal of power from terminals 5 and 7 of electric motor 9 (designated by numeral 24) results in a slow transition or degeneration from the voltage high (1) to a voltage low (0). Such a slow transition is caused by the fact that, upon removal of power from motor 9, the motor acts as a generator during deceleration until it slows to a stop. This is due to the fact that the rotating motor becomes a generator when driven mechanically. This will cause a floating voltage output to be generated from electric motor 9 across lines 25 and 27 which, if not accounted for, will lead to a delayed detection of the removal of applied operating voltage from the electric motor 9. This will introduce error in the determination and modeling of the operating characteristics of the electric motor 9.

To account for the above problem, and provide a basis for determining the precise time of removal of applied power from the electric motor 9, the differential voltage detection means 21 employs differential voltage divider pull-down circuitry 29 which, as shown in FIG. 4, effectively pulls the floated generated voltage across lines 25 and 27 to be virtually instantaneously centered about ground, thereby causing a sharp transition in voltage level at the inputs to electric motor 9 upon removal of power therefrom. More specifically, as shown in FIG. 1, each line 25 and 27 has an identical voltage pull-down circuit connected at the inputs $D_0$ and $D_1$ to the microcontroller 23, respectively. With such circuitry 29, the output voltage generated by motor 9 across terminals 5 and 7 is presented with equal impedance paths along lines 25 and 27 to a common ground, thereby causing the generated voltage to float both positive and negative values on lines 25 and 27 which are centered about ground.

With reference to FIG. 4, such sharp transitions at input terminals 5 and 7 are shown at points 30 and 32, respectively. It is noted that the input terminal 7, which is at a voltage low (0) in the illustrated example, has a sharp drop to a negative voltage level upon removal of power from motor 9, and the (+) input terminal 5, which is at a voltage high (1), undergoes a sharp drop to a positive voltage level upon such removal of power. As the voltage at point 32 is negative and the voltage at point 30 is positive, they are centered about and decay toward ground as the velocity of the loaded motor slows to a stop. Such transitions in voltage level are nearly instantaneous, which facilitates accurate detection of power disconnection from motor 9 by the differential input detecting means 21.

FIG. 4 also shows the effects of non-ideal switch closure at the point of application of power. Closure of switch 15 at terminals 5 and 7 are designated in FIG. 4 at points 34 and 36, respectively. As is evident, the non-ideal closure of switch 15 has caused both terminals 5 and 7 to momentarily be both at voltage highs (1), indicating no operation of motor 9. This is caused because, without complete switch closure, motor 9 is an open circuit through which no current is flowing. Thus, there is no voltage drop through motor 9 and the voltage applied on one input terminal is also present at the other input terminal. Immediately thereafter, however, complete switch closure is made and (−) input terminal 7 drops to a voltage low and (+) input terminal 5 remains high, indicating motor operation in the forward direction (see truth table in FIG. 2).

Since the actual threshold voltage for detection by the detection means 21 of the microcontroller 23 has been chosen for illustration as 2.5 volts, the values of voltage dividing resistors $R_1$ and $R_2$ are chosen to scale, or shift, the sharp transitions of motor voltage level such that the voltage level at inputs $D_0$ and $D_1$ will cross the predetermined threshold level when appropriate, thereby indicating power removal from the electric motor 9. This is best shown in FIG. 5, where the voltage levels at inputs $D_0$ and $D_1$ are graphed, and show the scaling of the applied voltage graphed in FIG. 4 to a level allowing detection of the transition across the threshold voltage (2.5 volts) at input $D_0$ (designated at point 38 in FIG. 5). Of course, reverse operation of motor 9 would cause the graphs shown in FIG. 5 to be reversed.

The zener diodes $Z_1$ and $Z_2$ are included in the voltage pull-down circuits to prevent damage of the digital inputs $D_0$ and $D_1$ of microcontroller 23 from either voltages greater than 5 volts or less than a negative 0.7 volts. This protection is necessary, as the shift in the floated generated voltage from electric motor 9, upon removal of power therefrom, can induce significant negative voltages which could damage the digital inputs $D_0$ and $D_1$ without such protection.

Once accurate detection of application or removal of applied voltage to the electric motor 9 is accomplished, the detection means 21 is used to control the operation of the position determining means within microcontroller 23. Such position determining means is comprised of an appropriate software model 35 that utilizes data obtained from the differential input voltage detection means 21 and an applied voltage sampling means 37 to simulate substantially the acceleration, deceleration and velocity characteristics of the electric motor 9 as a function of applied voltage thereto and the associated load characteristics of the electromechanical system 1 within which it operates.

The sampling means 37 which provides data to the software model 35 is connected via line 39 to the supply voltage 3. Sampling of the applied voltage is accomplished by means of a precision voltage divider 41 connected to one of the analog-to-digital converter inputs 43 of the microcontroller 23. Resistor values $R_3$ and $R_4$ are selected in accordance with the parameters of the system so as to provide the desired voltage input range to microcontroller 23. The sampling rate for obtaining voltage measurements by sampling means 41 is also dependent on the system parameters, and the desired accuracy which is required of the transducerless position determining system. For use in applications such as in determining the position of the trim on a personal watercraft, it has been found that a sampling rate of 30 samples per second is adequate.

The software model 35 of the electromechanical system 1 is developed through predetermined testing and collection of empirical data. Through use of the equation $X = X_0 + V_0 t + (at^2)/2$, where X is the position of a moving object relative to the object's known initial position ($X_0$), the object's initial velocity ($V_0$), the acceleration of the object (a) and the known time of movement (t), operation of the electric motor 9 may be characterized and modeled as a function of applied voltage to the motor.

First, by taking careful timing measurements of the time to travel a known distance at varying applied voltage levels, the speed of the electric motor 9 within the electromechanical system 1 can be determined as a function of the applied voltage to the motor. For voltages of varying amplitude levels, the speed of the motor 9 within the electromechanical system 1 will vary. Thus, numerous timing measurements and data are collected and stored within microcontroller 23 so as to characterize the speed of the electric motor as a function of the applied voltage thereto.

Once the speed of the electric motor 9 has been determined as a function of applied voltage thereto, the acceleration and deceleration characteristics can be determined through the use of the previous velocity data, along with careful distance and timing measurements. Thus, acceleration and deceleration values are also characterized as a function of applied voltage. Therefore, through the use of the above equation and careful timing and distance measurements, the speed, acceleration and deceleration characteristics of the electric motor 9 within the electromechanical system 1 may be accurately determined as a function of applied voltage to the electric motor 9, and stored within the memory of microcontroller 23.

Once the speed, acceleration and deceleration characteristics of the electric motor 9 are determined, the system is considered characterized and the position of the motor shaft 11, and consequently the movable component 13 driven thereby, can be determined through the use of a variable speed counter 45 within microcontroller 23, which is controlled by the differential input voltage detection means 21 and software model 35 within microcontroller 23. The software model 35 of the electric motor 9 is executed by microcontroller 23 at the same rate at which the applied voltage to the system is sampled at the analog-to-digital converter input 43 thereof. This rate of sampling and execution by microcontroller 23 is arbitrary and depends on the dynamics of the electromechanical system 1 in use, i.e., systems which operate at higher speeds or require a higher degree of accuracy would require a faster execution rate.

The system's applied voltage is represented as a positive integer to the resolution of the analog-to-digital converter 37. Speed of the system is represented as a positive or negative integer whose sign is determined by the direction of travel, and whose magnitude is determined by value representing the applied voltage. Acceleration values are represented as a percentage of maximum speed or measured voltage values and are characterized as a function of the applied voltage. The positional data resolution is determined by the sampling rate, the analog-to-digital converter resolution, and the time necessary for travel from end limit to end limit at a given voltage or speed.

Figure 6A:
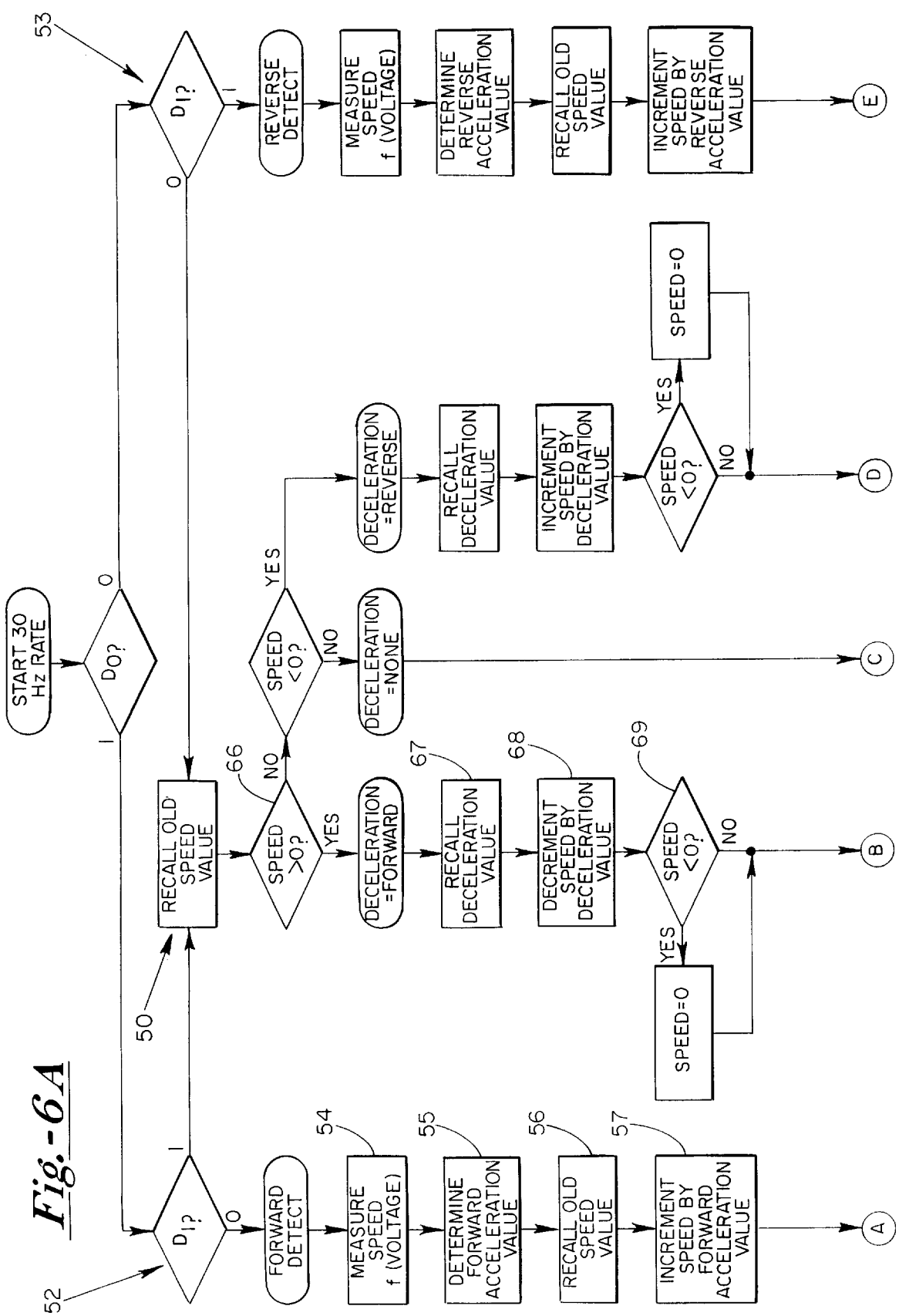

As shown in FIG. 6A, upon each execution of the software model 35 by microcontroller 23, the position determining process begins at start point 51. The first series of decisions made are by the differential input detection means 21 at microcontroller 23. These decisions are used to determine whether or not the electric motor 9 is running and, if so, in which direction. Both inputs, $D_0$ and $D_1$, to the differential input detection means 21 are polled, and the operation and direction are determined according to the truth table of FIG. 2. If it is determined that the motor is running forward, such that a voltage high (1) is sensed at input $D_0$ and a voltage low (0) is detected at input $D_1$, flow of the position determining process by software model 35 continues down the left outside path (designated by numeral 52) of the flow diagram shown in FIGS. 6A and 6B. If, however, it is determined that conditions exist which indicate that the electric motor 9 is running in reverse, flow of the positioning determining process continues down the right outside path (designated by numeral 53) of the flow diagram shown in FIGS. 6A and 6B.

As the position determining process conducted through paths 52 and 53 of the flow diagram are essentially the mirror images of each other, the discussion herein will be limited to the description of the process utilized for the electric motor 9 operating in the forward direction (path 52), it being understood that operation of the electric motor 9 in the reverse direction is essentially the same, except for the direction of adjustment of the variable speed counter 45 is opposite. It is noted, however, that it may be determined that the applied voltage has not made connection with the electric motor, or that power has been removed therefrom. Under such circumstances, it may be necessary to take into account run-on due to deceleration, in which case the flow of the position determining process in software model 35 extends down through the center portion of the flow diagram (designated as numeral 50) shown in FIGS. 6A and 6B. The function of accounting for run-on due to deceleration will be discussed in more detail hereinafter.

Upon detection of forward motor operation, the software model 35 causes the applied voltage to the electric motor 9 to be measured at step 54 via the sampling means 37 to determine what the full operational speed of the motor would be after taking into account start-up acceleration. This "measured" speed value, as a function of applied voltage, is then used by software model 35 to determine the acceleration value at step 55. As noted above, this is necessary in that the higher the applied voltage to the electric motor 9, the higher the rate of acceleration.

Once the current speed and acceleration value have been determined, the software model at step 56 recalls the previously determined speed value and increments this last known speed value in accordance with the appropriate determined acceleration value at step 57. It is noted that this last known speed value may be zero in the case of initial start-up of electric motor 9, or may be of a value greater than zero in the case where the electric motor 9 is already in operation.

Since the current speed determined can only be allowed to accelerate to the maximum operating speed for any given voltage, at step 58 in FIG. 6B, the incremented speed value in prior step 57 (FIG. 6A) of the flow diagram is compared to the maximum simulated speed as a function of applied voltage, which was determined at step 54 in the flow diagram. This enables the software model 35 to determine if the newly determined speed value has reached or exceeded its maximum. If so, at step 59 in the flow diagram, the speed value is set equal to the maximum speed value associated with the given applied voltage that has been measured by sampling means 37.

Once the appropriate speed value has been determined, the prior positional data of the variable speed counter 45 is recalled by software model 35 at step 60, and incremented at step 61 by an appropriate amount proportional to the simulated speed of electric motor 9 determined by software model 35. Since acceleration was accounted for in determining any new current speed of electric motor 9, incrementing variable speed counter 45 in accordance with such speed value also accounts for such acceleration of the system. Upon completion of this process, the new current position and speed are then stored within microcontroller 23 at steps 62 and 63 for use in the next execution of the position determining process.

It is noted that in position limited electromechanical systems, such as the trim function of a jet nozzle on a personal watercraft, where movement of the jet nozzle is limited within a specified range (i.e., 0°–150°), the newly determined positional data is compared at step 64 to determine whether it has exceeded the predetermined maximum limit set within microcontroller 23 for such value. If so, the new positional data is set equal to the maximum limit until such time that it is determined that the direction of operation of electric motor 9 has reversed. This provides periodic resynchronization of the position determining system for the electromechanical system.

At this point, one execution cycle of the position determining system of software model 35 is complete in the forward direction. The software model, at step 65, returns the process to step 51 (see FIG. 6A) to recycle and determine any further change in position of the movable component 13 within the electromechanical system 1. As stated previously, the rate of execution of software model 35 is arbitrary and depends upon the dynamics of the electromechanical system in use, and the higher the rate of execution, the higher degree of accuracy which will result therefrom.

In cases where there is no detection of applied voltage to cause forward or reverse operation of electric motor 9, it is still necessary to account for motor run-on and deceleration. As shown in FIG. 6A, the software model 35 accounts for such deceleration by first recalling the previous determined speed value and checking the same to determine whether the electric motor 9 was previously operating in the forward mode, reverse mode, or neither. This is shown in step 66 of the flow diagram in FIG. 6A. As the determination and effect of deceleration is the same but merely applied oppositely for forward and reverse operation of electric motor 9, it will only be necessary to discuss the process of accounting for deceleration in the forward direction, it being understood that application in the reverse direction is merely the mirror image thereof.

Upon sensing prior operation of electric motor 9 in the forward direction, predetermined deceleration values which are stored in memory within microcontroller 23 are recalled at step 67. Such deceleration values are applied to the forward speed value to decrement the same at step 68. If it is thereafter determined in step 69 that the speed value is still greater than zero, the newly determined speed value is input into the position determining process at step 60 (see FIG. 6B), where it is used to increment the counter 45 an appropriate amount based upon the newly determined speed value to account for run-on of motor 9. This process will be continued as long as no applied power is detected to cause forward or reverse operation of electric motor 9, and the newly determined speed value of motor 9 continues to be a non-zero value. Once the speed of electric motor 9 reaches zero, no further calculations take place and the electromechanical system 1 is considered to be at rest until detection of applied power thereto is once again sensed.

Through use of the above-described software model 35 of electric motor 9, the variable speed counter 45 may be incremented and decremented in accordance with the direction of motor operation at a rate of speed proportional to the simulated speed of electric motor 9 determined by software model 35, while accounting for acceleration and deceleration characteristics thereof. The rate of variable speed counter 45 is thus able to be altered based upon the measured applied voltage to the electric motor 9, which is proportional to the actual speed of the electric motor 9 within the electromechanical system 1. Upon disconnect of the applied voltage, the counter 45 allows for the appropriate amount of run-on as a result of deceleration. The data obtained from the variable speed counter 45 is scaled to appropriately represent the desired units, such as degrees, and is then transmitted to display 47 as readable positional information. In this manner, in systems where it is either cost prohibitive or there are significant reliability concerns over the use of a position indicating transducer, the position of a movable component within an electromechanical system may be accurately determined via the use of the above-described transducerless position determining system. Such positional data may be readily converted to a readable format, and displayed for the operator's view.

It will, of course, be understood that various changes may be made in the form, details, arrangement and proportions of the parts without departing from the scope of the invention which comprises the matter shown and described herein and set forth in the appended claims.

I claim:

1. In an electromechanical system having associated load characteristics and an electric motor for driving a mechanical component, a transducerless position determining system for determining the position of said mechanical component, comprising:

(a) means for detecting of application or removal of applied voltage to, and direction of operation of, said electric motor;

(b) applied voltage sampling means connected to said electric motor for determining amplitude level of said applied voltage to said electric motor;

(c) a control means including a motor software model connected to said detection means and said sampling means, said control means being designed to simulate substantially the acceleration, deceleration and velocity characteristics of said electric motor as a function of said applied voltage and load characteristics of said electromechanical system; and (d) a variable speed counter being devoid of connection to a positional transducer and being connected in controlled relation to said detection means and said control means so as to increment and decrement at a rate of speed proportional with that of said electric motor and said mechanical component, thereby providing positional data correlating to the relative position of said mechanical component.

2. The transducerless position determining system defined in claim 1, wherein said motor includes a pair of power input terminals and said detecting means is comprised of a differential input detector connected to each terminal of said pair of input terminals for determining actual application or removal of applied voltage to each of said terminals.

3. The transducerless position determining system defined in claim 2, including voltage shifting means connected to said power input terminals for causing floating generated voltage produced by said electric motor upon removal of power therefrom to undergo an abrupt shift in amplitude level, thereby enabling said detection means to timely detect removal of said applied voltage from said motor.

4. The transducerless position determining system defined in claim 3, wherein said voltage shifting means includes a pull-down circuit of equal impedance connected to each of said power input terminals of said motor, thereby causing floating generated voltage produced by said motor upon removal of applied voltage therefrom to be abruptly shifted and centered about ground.

5. The transducerless position determining system defined in claim 1, wherein said software model is controlled by said detection means and includes means for summing acceleration and deceleration characteristics of said electric motor upon detection by said detecting means of reversal of applied voltage prior to completion of deceleration within said motor software model resulting from a prior detection of removal of applied voltage from said motor.

6. The transducerless position determining system defined in claim 1, wherein said software model includes means for providing piecemeal application of acceleration and deceleration characteristics over time.

7. The transducerless position determining system defined in claim 1, including means for scaling said positional data obtained from said counter into desired units of measure, and means for displaying said units of measure which represents the position of said mechanical component within said electromechanical system.

8. The transducerless position determining system defined in claim 1, wherein said software model of said electric motor includes means for synchronizing said positional data of said counter to correlate with a predetermined reference position of said mechanical component within said electrical mechanical system.

9. The transducerless position determining system defined in claim 1, wherein said software model adjusts said simulated velocity, acceleration and deceleration characteristics of said motor as a function of the amplitude level of said applied voltage at the rate at which said sampling means samples said applied voltage.

10. A transducerless position determining system for determining the position of a movable component in an electromechanical system, comprising:

(a) an electromechanical system including a movable component driven by an electric motor having a pair of power input terminals that are connectable to a power supply, the direction of operation of said motor being dependent upon the polarity of applied voltage across said pair of input terminals;

(b) a differential input detection means connected to said pair of input terminals of said motor for detecting application or removal of applied voltage thereto and consequent direction of operation of said motor resulting therefrom;

(c) applied voltage sampling means connected to said power supply for monitoring amplitude level of said applied voltage to said pair of power input terminals of said electric motor; and (d) transducerless position determining means connected in controlled relation to said detection means for determining the position of said movable component based on data received from said detection means and said sampling means relative to the functional characteristics of said electric motor within said electromechanical system;

(e) said transducerless position determining means including a software model of said electric motor designed to simulate substantially the acceleration, deceleration and velocity characteristics of said electric motor as a function of said applied voltage and load characteristics of said electromechanical system.

11. The transducerless position determining system defined in claim 10, wherein said software model includes means for applying acceleration and deceleration characteristics of said electric motor piecewise over time at a rate determined by said applied voltage sampling means.

12. The transducerless position determining system defined in claim 10, wherein said transducerless position determining means includes a variable speed counter connected in controlled relation to said detection means and said software model so as to increment and decrement at a rate of speed proportional with that of said electric motor and said movable component driven thereby, thus providing positional data correlating to the relative position of said movable component within said electromechanical system.

13. The tansducerless position determining system defined in claim 12, including means for scaling said positional data obtained from said counter into desired units of measure, and means for displaying said units of measure which represents the position of said movable component within said electromechanical system.

14. The transducerless position determining system defined in claim 10, wherein said transducerless position determining means includes a position synchronization means for synchronizing said position determining means with at least one known reference position of said movable component within said electromechanical system.

15. The transducerless position determining system defined in claim 14, wherein said movable component has a limited range of movement between opposite end points, at least one of said end points constituting said at least one known reference position of said movable component.

16. The transducerless position determining system defined in claim 10, including voltage shifting means connected to said power input terminals for causing floating generated voltage produced by said electric motor upon removal of power therefrom to undergo an abrupt shift in amplitude level, thereby enabling said detection means to accurately detect removal of said applied voltage from said motor.

17. The transducerless position determining system defined in claim 16, wherein said voltage shifting means includes a pull-down circuit connected to each of said input power terminals of said electric motor, thereby causing floating generated voltage produced by said motor upon removal of applied voltage therefrom to be abruptly shifted, thus enabling said differential detection means to detect said shift and consequent removal of applied voltage from said motor.

18. The transducerless position determining system defined in claim 10, wherein said differential input detection means is constructed to detect application or removal of applied voltage to each of said pair of input terminals of said electric motor by sensing level transition of said applied voltage across a predetermined threshold voltage level.

19. The transducerless position determining system defined in claim 18, wherein said pair of input terminals to said electric motor constitute a first terminal and second terminal, and said detection means is constructed to determine direction of operation of said motor in accordance with the following truth table:

| Terminal 1 | Terminal 2 | Direction |
|---|---|---|
| 0 | 0 | Stop |
| 0 | 1 | Reverse |
| 1 | 0 | Forward |
| 1 | 1 | Stop | wherein a "1" indicates detection of applied voltage level above said threshold voltage, and a "0" indicates detection of applied voltage below said threshold voltage level.

20. A transducerless position determining system for determining the position of a movable component in an electromechanical system, comprising:

(a) an electromechanical system including a movable component driven by an electric motor having at least one power input terminal that is connectable to a power supply, the direction of operation of said motor being dependent upon the applied voltage to each said input terminal;

(b) an input detection means connected to at least one said input terminal for detecting the application or removal of applied voltage thereto and consequent direction of operation of said motor resulting therefrom;

(c) applied voltage sampling means connected to said power supply for periodic sampling of the amplitude level of said applied voltage to said electric motor; and (d) a transducerless position determining means connected in controlled relation to said detection means for determining the position of said movable component based on data received from said detection means and said sampling means relative to the functional characteristics of said electric motor within said electromechanical system;

(e) said transducerless position determining means including a software model of said electric motor designed to simulate substantially the acceleration, deceleration and velocity characteristics of said electric motor as a function of the amplitude level of said applied voltage and load characteristics of said electromechanical system.

21. The transducerless position determining system defined in claim 20, wherein said simulated velocity, acceleration and deceleration characteristics of said electric motor are determined and adjusted periodically in accordance with the applied voltage sampled by said sampling means at the rate of sampling conducted thereby.

22. The transducerless position determining system defined in claim 20, wherein said electric motor includes a pair of power input terminals to which said input detection means is connected, said input detection means detecting application of applied voltage only upon sensing a voltage amplitude level on one of said terminals above a predetermined threshold level and a voltage amplitude level on the other of said input terminals below said predetermined threshold level.

23. The transducerless position determining system defined in claim 20, wherein said transducerless position determining means includes a position synchronization means for synchronizing said position determining means with at least one known reference position of said movable component within said electromechanical system.

24. The transducerless position determining system defined in claim 20, wherein said transducerless position determining means includes a variable speed counter connected in controlled relation to said detection means and said sampling means so as to increment and decrement at a rate of speed proportional with that of said electric motor and said movable component driven thereby, thus providing positional data correlating to the relative position of said movable component within said electromechanical system.

25. The transducerless position determining system defined in claim 20, including voltage shifting means connected to each said power input terminal for causing floating generated voltage produced by said electric motor upon removal of power therefrom to undergo an abrupt shift in amplitude level so as to enable said detection means to accurately and timely detect removal of said applied voltage from said motor.

26. For use in an electromechanical system having associated load characteristics and including a movable component that is driven by an electric motor with at least one power input terminal connected to a power supply, a method of determining the position of said movable component as it is moved within the electromechanical system without the use of a position transducer, comprising the steps of:

(a) providing a simulation means designed to simulate substantially the acceleration, deceleration and velocity characteristics of said electric motor as a function of applied voltage to said motor and associated load characteristics of said electromechanical system;

(b) detecting application or removal of applied voltage to at least one of said power input terminals and determining therefrom the current operating conditions of said electric motor;

(c) sampling periodically said applied voltage to at least one of said power input terminals of said motor;

(d) simulating operation of said electric motor with said simulating means based on current operating conditions determined, applied voltage sampled and existing load characteristics of said electromechanical system;

(e) adjusting a variable speed counter that is devoid of connection to a positional transducer as needed with said simulation means to increment or decrement in relation to the relative direction of operation of said motor at a rate of speed proportional to the actual speed of said motor, thereby providing means for determining the relative position of said movable component being driven by said motor within said electromechanical system; and (f) repeating steps (b) through (e) during operation of said electromechanical system.

27. A transducerless position determining system for determining the position of a movable component in an electromechanical system, comprising:

(a) an electromechanical system including a movable component driven by an electric motor having a pair of power input terminals that are connectable to a power supply, the direction of operation of said motor being dependent upon the polarity of applied voltage across said pair of input terminals;

(b) a differential input detection means connected to said pair of input terminals of said motor for detecting application or removal of applied voltage thereto and consequent direction of operation of said motor resulting therefrom;

(c) applied voltage sampling means connected to said power supply for monitoring amplitude level of said applied voltage to said pair of power input terminals of said electric motor;

(d) a transducerless position determining means connected in controlled relation to said detection means for determining the position of said movable component based on data received from said detection means and said sampling means relative to the functional characteristics of said electric motor within said electromechanical system; and (e) voltage shifting means connected to said power input terminals for causing floating generated voltage produced by said electric motor upon removal of power therefrom to undergo an abrupt shift in amplitude level, thereby enabling said detection means to accurately detect removal of said applied voltage from said motor.

28. The transducerless positioning determining system defined in claim 27, wherein said voltage shifting means includes a pull-down circuit connected to each of said input power terminals of said electric motor, thereby causing floating generated voltage produced by said motor upon removal of applied voltage therefrom to be abruptly shifted, thus enabling said differential detection means to detect said shift and consequent removal of applied voltage from said motor.

29. A transducerless position determining system for determining the position of a movable component in an electromechanical system, comprising:

(a) an electromechanical system including a movable component driven by an electric motor having first and second power input terminals that are connectable to a power supply, the direction of operation of said motor being dependent upon the polarity of applied voltage across said first and second power input terminals;

(b) a differential input detection means connected to said first and second power input terminals of said motor for detecting application or removal of applied voltage thereto and consequent direction of operation of said motor resulting therefrom;

(c) applied voltage sampling means connected to said power supply for monitoring amplitude level of said applied voltage to said first and second power input terminals of said electric motor;

(d) a transducerless position determining means connected in controlled relation to said detection means for determining the position of said movable component based on data received from said detection means and said sampling means relative to the functional characteristics of said electric motor within said electromechanical system; and (e) said differential input detection means being constructed to detect application or removal of applied voltage to each of said first and second power input terminals, and direction of operation of said electric motor, by sensing level transition of said applied voltage across a predetermined threshold voltage level in accordance with the following truth table:

| Terminal 1 | Terminal 2 | Direction |
|---|---|---|
| 0 | 0 | Stop |
| 0 | 1 | Reverse |
| 1 | 0 | Forward |
| 1 | 1 | Stop | wherein a "1" indicates detection of applied voltage level above said threshold voltage, and a "0" indicates detection of applied voltage below said threshold voltage level.

30. A transducerless position determining system for determining the position of a movable component in an electromechanical system, comprising:

(a) an electromechanical system including a movable component driven by an electric motor having a pair of power input terminals that are connectable to a power supply, the direction of operation of said motor being dependent upon the applied voltage to each of said input terminals;

(b) an input detection means connected to said pair of input terminals for detecting the application or removal of applied voltage thereto and consequent direction of operation of said motor resulting therefrom, said input detection means detecting application of applied voltage only upon sensing a voltage amplitude level on one of said terminals above a predetermined threshold level and a voltage amplitude level on the other of said input terminals below said predetermined threshold level;

(c) applied voltage sampling means connected to said power supply for periodic sampling of the amplitude level of said applied voltage to said electric motor; and (d) a transducerless position determining means connected in controlled relation to said detection means for determining the position of said movable component based on data received from said detection means and said sampling means relative to the functional characteristics of said electric motor within said electromechanical system.

31. A transducerless position determining system for determining the position of a movable component in an electromechanical system, comprising:

(a) an electromechanical system including a movable component driven by an electric motor having at least one power input terminal that is connectable to a power supply, the direction of operation of said motor being dependent upon the applied voltage to each said input terminal;

(b) an input detection means connected to at least one said input terminal for detecting the application or removal of applied voltage thereto and consequent direction of operation of said motor resulting therefrom;

(c) applied voltage sampling means connected to said power supply for periodic sampling of the amplitude level of said applied voltage to said electric motor; and (d) a transducerless position determining means connected in controlled relation to said detection means for determining the position of said movable component based on data received from said detection means and said sampling means relative to the functional characteristics of said electric motor within said electromechanical system;

(e) said transducerless position determining means including a variable speed counter connected in controlled relation to said detection means and said sampling means so as to increment and decrement at a rate of speed proportional with that of said electric motor and said movable component driven thereby, thus providing positional data correlating to the relative position of said movable component within said electromechanical system.

32. A transducerless position determining system for determining the position of a movable component in an electromechanical system, comprising:

(a) an electromechanical system including a movable component driven by an electric motor having at least one power input terminal that is connectable to a power supply, the direction of operation of said motor being dependent upon the applied voltage to each said input terminal;

(b) an input detection means connected to at least one said input terminal for detecting the application or removal of applied voltage thereto and consequent direction of operation of said motor resulting therefrom;

(c) applied voltage sampling means connected to said power supply for periodic sampling of the amplitude level of said applied voltage to said electric motor;

(d) a transducerless position determining means connected in controlled relation to said detection means for determining the position of said movable component based on data received from said detection means and said sampling means relative to the functional characteristics of said electric motor within said electromechanical system; and (e) voltage shifting means connected to each said power input terminal for causing floating generated voltage produced by said electric motor upon removal of power therefrom to undergo an abrupt shift in amplitude level so as to enable said detection means to accurately and timely detect removal of said applied voltage from said motor.

* * * * *